Sept. 1, 1964
C. P. ALBERTSON
3,147,169
APPARATUS FOR DETERMINING THICKNESS DURING CHEMICAL MILLING
Filed Feb. 23, 1961
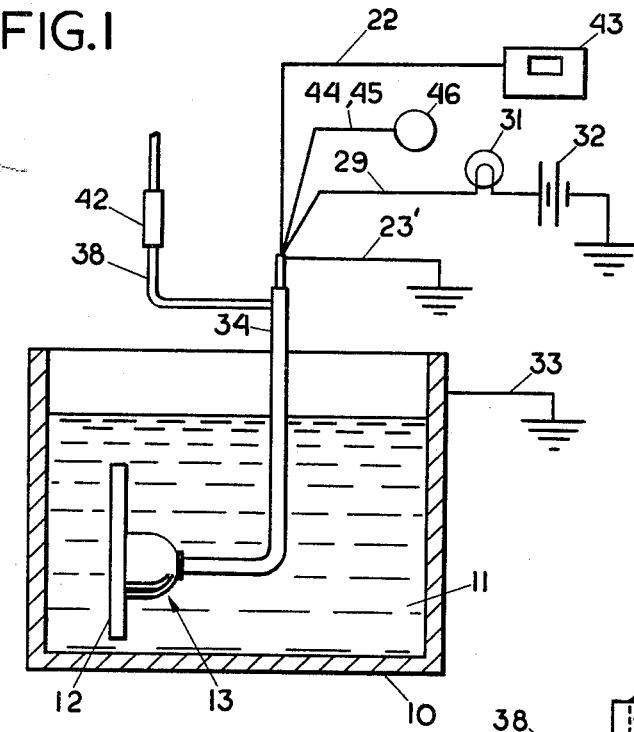
FIG.1
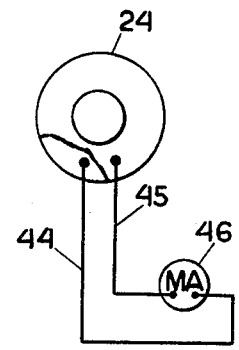
FIG.3
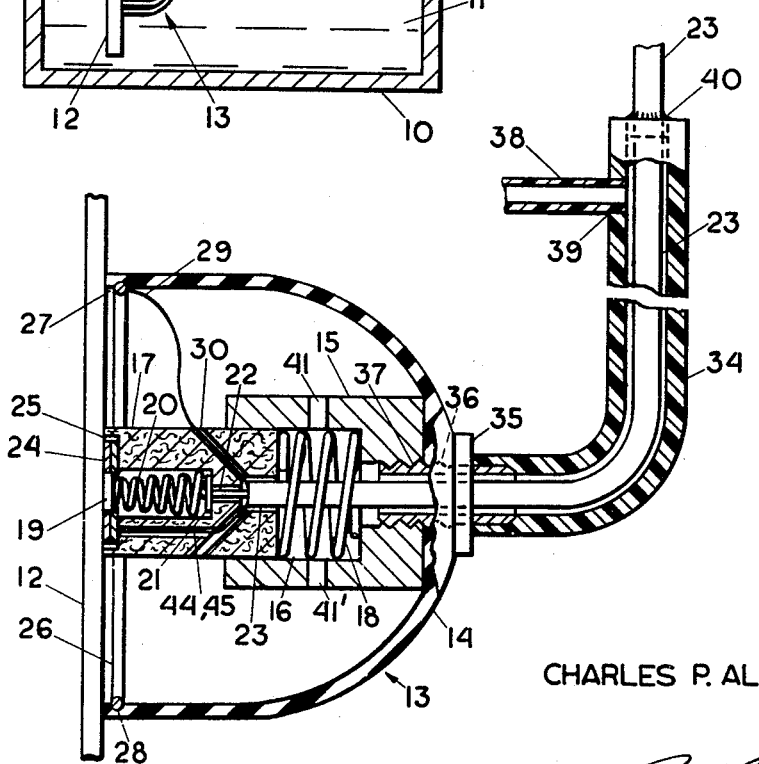
FIG.2
CHARLES P. ALBERTSON
*INVENTOR.*
ATTORNEY ' # United States Patent Office 3,147,169
Patented Sept. 1, 1964

3,147,169
APPARATUS FOR DETERMINING THICKNESS DURING CHEMICAL MILLING
Charles P. Albertson, Woodbury, N.Y., assignor to Grumman Aircraft Engineering Corporation, Bethpage, N.Y., a corporation of New York
Filed Feb. 23, 1961, Ser. No. 90,997
6 Claims. (Cl. 156—345)

This invention relates to the process of chemical etching or milling, and more particularly to ultrasonic resonance means for continuously gauging the thickness of the workpiece during the process.

According to conventional practice, process control in the etching of various materials has been on a straight time and etchant temperature basis or by periodically removing the workpiece and making physical measurements thereof to determine the depth of etch. Because it is impractical to control effectively the various factors that influence the etching rate, and because of the loss of time and accuracy resulting from the removal of the part from the bath, these conventional methods have inherent disadvantages. Other methods for controlling the etching process have been proposed, but they impose a penalty of substantially increased cost, complexity, and restricted flexibility on the process.

The principal object of this invention thus is to provide an apparatus that can be immersed safely in the etching solution for continuously gauging the thickness of a workpiece undergoing chemical etching.

Another object of this invention is the provision of thickness measuring means in which the measurement is made directly and is not dependent on the original dimensions of the part or on the amount of material removed during the process.

Another object is the provision of an apparatus that will facilitate the use of the etching process on a production basis by allowing the thickness of the workpiece to be continuously monitored without requiring that the part be removed from the etching solution or necessitating any other interruption of the etching process, and further providing that a high standard of accuracy may be maintained on a production basis with the required inspections being confined to a single final inspection.

A further object of this invention is the provision of means for maintaining a transducer in contact with the workpiece undergoing etching to measure the thickness thereof as a function of its ultrasonic resonance, and further providing protection of the transducer from exposure to the etching solution.

A still further object of this invention is the provision of leakage detecting means to give an immediate indication of entry of the etching solution into the chamber formed by the workpiece and the transducer holding means to reduce the possibility of damage to the transducer and related operative elements from that solution.

Yet another object is the provision of temperature sensing means associated with the transducer to provide a continuous indication of the local temperature of the workpiece and surrounding etching solution.

A further object is the provision of a suction means for maintaining the transducer holding means in leakproof contact with the workpiece, and further providing that said suction will precipitate and intensify incipient leakage into the transducer head to facilitate the detection of a failure in the sealing means.

Other objects and advantages of the invention will become apparent from the following description taken in conjunction with the accompanying drawings in which:

FIG. 1 is a sectional view in elevation of an etching or chemical milling tank with a workpiece immersed therein and including a schematic representation of the various elements of the present invention;

FIG. 2 is an enlarged sectional view of the transducer holding means; and

FIG. 3 is an electrical circuit diagram of the temperature sensing means.

As shown in FIG. 1, a conventional chemical milling or etching tank 10 contains an etching solution 11. This etching solution may be of any suitable etchant well known in the art and may be of an acid or alkaline type depending on the particular metal or material being etched. Immersed in the etching solution is the workpiece 12 which may be placed on a support or platform or may be suspended in the solution by any suitable means not shown. Attached to the workpiece in a manner to be described hereinbelow, on the face opposite to that being etched, are the transduced maintaining or holding means 13 of the present invention.

The transducer holding means 13, shown in detail in the sectional view of FIG. 2, is comprised of a substantially cup-shaped member 14 constructed of a material, e.g., rubber or plastic, which resists attack by the etching solution. Located in the apex of the member 14 is a cylindrical housing 15 having an enlarged bore 16 in which the end of a cylindrical transducer cartridge 17 is contained. This cartridge, which may be constructed of a fibrous or other suitable material, is biased by a spring 18 contained within the bore 16 which exerts a pressure on the cartridge 17 in a direction tending to eject it from the housing 15. In the end of the cartridge 17 extending from the housing 15 is an ultrasonic transducer crystal 19. The transducer crystal may be quartz, barium titanate or other satisfactory material well known in the art, possessing piezoelectric properties and which can be excited to a longitudinal mode of vibration. The transducer crystal 19 is connected by a helically-wound conductor 20 to a metal disk 21 which is brazed or otherwise affixed to the end of a conductor 22 which projects out of the end of a shielded coaxial cable 23 grounded as at 23'. In addition to conducting current from the conductor 22 to the transducer crystal 19, the conductor 20 acts as a spring to tend to eject the transducer crystal 19 from the transducer cartridge 17. The conductor 22, as shown in FIG. 1, is connected to an ultrasonic generator and detector 43 which forms no part of the present invention and accordingly is not illustrated or described in detail herein.

Surrounding the transducer crystal 19 are temperature responsive means 24 comprising a bimetallic washer and being retained in a counterbore 25 in the end of the bore of the cartridge 17. The faces of the transducer crystal 19 and the temperature responsive means 24 are located in substantially the same plane so that intimate contact is achieved in the operative position between these elements and the workpiece 12. Encircling the inner lip of the member 14 in a spaced relationship with the edge thereof is a ring-like or annular electrode 26 which also acts in a manner to stiffen the member 14 and prevent it from collapsing when subjected to external fluid pressure. The electrode 26 is press fit or is otherwise suitably retained in a circumferential groove 28 formed on the inner surface the member 14 adjacent the open end thereof such that when the transducer holding means 13 are attached in the operative position to the workpiece, a uniform circumferential air gap 27 of substantially minute dimension will exist between the electrode 26 and the face of the workpiece 12. A single-conductor electrode lead 29, whose one end is soldered or otherwise affixed to the electrode 26, is connected through a passage 30 in the transducer cartridge 17 to the electrical circuit shown in FIG. 1. As shown therein, the lead 29 connects through an alarm lamp or other suitable indicating means 31 to a low-voltage source 32. Should a leak develop anywhere along the lip of the member 14, fluid entering into the chamber will bridge the gap 27 between the electrode 26 and the workpiece 12. There will thus be a current flow from the source 32 through the alarm 31, the conductor 29 to the electrode 26 and thence either through the fluid bridging the gap 27 and the workpiece 12 or through the fluid bridging the gap 27, the etchant solution 11 contained in the tank 10, the tank 10 and a ground line 33.

Other suitable warning devices can be incorporated in the leak-indicating circuit or the circuit can be used to actuate a relay connected into a hoisting circuit to lift the transducer holding means 13 and the workpiece clear of the etching solution when a leak is detected.

Still referring to FIG. 2, a hose or tube 34 connected to the transducer holding means 13 leads upwardly therefrom to a point above and outside the tank 10. This tube may be constructed of a material, e.g., rubber or plastic, which resists attack by the etching solution. However, should it be found desirable, the tube may be fabricated of metal which is then suitably protected from attack by the etching solution by a coating or sheath of protective material. A suitable flanged union joint 35 secured in the bore in the end of the tube 34 is threaded through an opening 36 in the apex of the holder. This union joint is screwed into a threaded section 37 in the bore of the housing 15 to connect the tube securely in a leakproof coupling to the transducer holding means 13.

The tube 34 forms a conduit in which the coaxial cable 23 is contained and protected from the etching solution. The diameter of the coaxial cable 23 is substantially smaller than the inside diameter of the tube 34 so that there is sufficient room to allow the passage of air through the tube. A hose 38 connected to a vacuum source, as for example a high-velocity vacuum pump, not shown, is coupled through the wall of the tube 34 at a location 39 above the level of the etchant solution 11. A suitable filler 40 surrounding cable 23 forms a leakproof seal for the outer end of tube 34. When the vacuum pump is operating with the transducer holding means in the operative position, air is exhausted from the cup-shaped member 14 through passages 41 41' which open into the bore 16 of the housing 15 and out through tube 34 and hose 38 to the vacuum source. To prevent the etchant solution from being sucked into the vacuum pump and causing damage thereto should a leak in the cup-shaped member 14 or the tube 34 develop while the transducer holding means 13 is immersed in the solution, a check valve 42 is incorporated in the vacuum hose 38. This check valve may be of a float type, or any suitable valve such as the commercially available "King Siphon Safety Valve."

Referring now to FIG. 3, there is shown the electrical circuit for the temperature sensing means 24. As shown, the leads 44 and 45 connect to different halves of the bimetallic washer comprising such means and at their opposite ends connect to an indicator 46 of well known type. For convenience, the leads 44 and 45 are contained within the coaxial cable 23. It will be seen that when the transducer holding means 13 are in the operative position shown in FIG. 2, the temperature sensing means 24 are in contact with the workpiece 12 and in addition to providing a continuous indication of the local temperature of the workpiece, the ambient temperature of the etching solution may be monitored. By using two or more transducers and transducer holding means including the disclosed temperature sensing means, spaced in a predetermined pattern on the workpiece, it is possible to determine the temperature gradient of the etching solution, if any, as well as any variations in the rate of etch.

In using the present invention for monitoring the chemical etching or milling process, the operator first dips the face of the crystal of transducer 19 in oil or other suitable coupling material. The cup-shaped member 14 which contains the transducer is then affixed to the workpiece by means of a suitable adhesive applied around the lip of the member 14. Using a latex compound or other suitable etch-proof material, the workpiece 12 and the transducer holding means 13 are coated or masked. After the masking material has been stripped away in the area to be etched, i.e., on the face of the workpiece opposite to the side to which the transducer is affixed, the vacuum pump is energized and the workpiece and the attached transducer holding means is immersed in the etching solution. It is to be understood, of course, that the operator may monitor the process and lift out the workpiece when the desired depth of etch has been reached, or the transducer output may be coupled to a hoisting motor circuit to lift the workpiece out of the solution automatically when a pre-set depth of etch has been achieved.

Although shown and described in what is believed to be the most practical and preferred embodiment, it is apparent that departure therefrom will suggest themselves to those skilled in the art and may be made without departing from the spirit and scope of the invention. I therefore do not wish to restrict myself to the particular form of construction illustrated and described, but desire to avail myself of all modifications that may fall within the scope of the appended claims.

Having thus described my invention, what I claim is:

1. In apparatus for determining the thickness of a workpiece during chemical etching by immersion, a transducer, a cup-shaped member, the open end of said member being in contact with the face of the workpiece to thereby define with the workpiece a chamber within which said transducer is contained, a groove provided on the inner surface of said cup-shaped member adjacent the open end thereof, an annular electrode contained within said groove, means including a housing attached to one end thereof to the apex of said cup-shaped member and provided at its other end with means for maintaining said transducer in contact with the face of the workpiece, and means communicating through said housing for applying a vacuum to said chamber.

2. In apparatus for determining the thickness of a workpiece during chemical etching by immersion, a cup-shaped member, the open end of said member being in contact with the face of the workpiece to thereby define with the workpiece a chamber, a groove provided on the inner surface of said cup-shaped member adjacent the open end thereof, an annular electrode contained within said groove, a housing attached at one end thereof to the apex of said cup-shaped member and provided at its other end with an enlarged bore, a transducer cartridge having one end thereof contained within said enlarged bore of said housing and adapted to carry at its other end a transducer, means for maintaining said transducer in contact with the face of the workpiece, passages in the walls of said housing connecting said chamber with the enlarged bore of said housing, and means communicating with the enlarged bore of said housing for applying a vacuum thereto and through said passages to said chamber.

3. In apparatus for determining the thickness of a workpiece during chemical etching by immersion, a transducer, a cup-shaped member, the open end of said member being in contact with the face of the workpiece to thereby define with the workpiece a chamber within which said transducer is contained, a groove provided on the inner surface of said cup-shaped member adjacent the open end thereof, an annular electrode contained within said groove, means including a housing attached at one end thereof to the apex of said cup-shaped member and provided at its other end with means for maintaining said transducer in contact with the face of the workpiece, means communicating through said housing with said chamber for applying a vacuum thereto, and a voltage source and alarm means in circuit with said electrode for indicating leakage of etching solution past the edge of said cup-shaped member and into said chamber.

4. In apparatus for determining the thickness of a workpiece during chemical etching by immersion, a transducer, a cup-shaped member, the open end of said member being in contact with the face of the workpiece to thereby define with the workpiece a chamber within which said transducer is contained, a groove provided on the inner surface of said cup-shaped member adjacent the open end thereof, an annular electrode contained within said groove, means including a housing attached at one end thereof to the apex of said cup-shaped member and provided at its other end with means for maintaining said transducer in contact with the face of the workpiece, temperature sensing means carried by said second mentioned means and adapted to contact the face of the workpiece for sensing the temperature thereof, means communicating through said housing with said chamber for applying a vacuum thereto, a voltage source and alarm means in circuit with said electrode for indicating leakage of etching solution past the edge of said cup-shaped member and into said chamber, and means in circuit with said temperature sensing means for indicating the temperature of said workpiece.

5. In apparatus for determining the thickness of a workpiece during chemical etching by immersion, a cup-shaped member, the open end of said member being in contact with the face of the workpiece to thereby define with the workpiece a chamber, a groove provided on the inner surface of said cup-shaped member adjacent the open end thereof, an annular electrode contained within said groove, a housing attached at one end thereof to the apex of said cup-shaped member and provided at its other end with an enlarged bore, a transducer cartridge having one end thereof contained within said enlarged bore of said housing and adapted to carry at its other end a transducer, means for maintaining said transducer in contact with the face of the workpiece, an enlarged bore provided in that end of said transducer cartridge in which is carried said transducer, temperature sensing means comprising a bimetallic washer contained within said enlarged bore of said transducer cartridge and adapted to contact the face of the workpiece, passages in the walls of said housing connecting said chamber with the enlarged bore of said housing, and means communicating with the enlarged bore of said housing for applying a vacuum thereto and through said passages to said chamber.

6. Apparatus set forth in claim 5 and including a voltage source and alarm means in circuit with said electrode for indicating leakage of etching solution past the edge of said cup-shaped member and into said chamber.

References Cited in the file of this patent
UNITED STATES PATENTS

| | | |
|---|---|---|
| 2,431,233 | Erwin | Nov. 18, 1947 |
| 2,592,134 | Firestone | Apr. 8, 1952 |
| 2,820,312 | Coontz | Jan. 21, 1958 |
| 2,955,185 | Cox | Oct. 4, 1960 |
| 2,968,688 | Skinner | Jan. 17, 1961 |